(12) United States Patent
Nuber et al.

(10) Patent No.: US 7,008,713 B2
(45) Date of Patent: Mar. 7, 2006

(54) FULLERENE-BASED PROTON CONDUCTIVE MATERIALS

(75) Inventors: Berthold Nuber, Kanagawa (JP); Bjoern Pietzak, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/985,492

(22) Filed: Nov. 10, 2004

(65) Prior Publication Data

US 2005/0064262 A1    Mar. 24, 2005

Related U.S. Application Data

(62) Division of application No. 10/115,109, filed on Apr. 1, 2002.

(30) Foreign Application Priority Data

Feb. 5, 2002    (JP) .............................. P2002-028642

(51) Int. Cl.
*H01M 8/10*    (2006.01)
(52) U.S. Cl. ........................... 429/33; 429/306; 558/87
(58) Field of Classification Search ................. 429/33, 429/306; 558/87
See application file for complete search history.

(56) References Cited

U.S. PATENT DOCUMENTS

| | | | |
|---|---|---|---|
| 5,470,680 A | 11/1995 | Loutfy et al. | 429/218 |
| 5,874,523 A * | 2/1999 | Schmiegel | 528/481 |
| 6,080,501 A * | 6/2000 | Kelley et al. | 429/31 |
| 6,162,926 A | 12/2000 | Murphy et al. | 548/417 |
| 6,231,980 B1 | 5/2001 | Cohen et al. | 428/402 |
| 6,495,290 B1 * | 12/2002 | Hinokuma et al. | 429/231.8 |
| 6,726,963 B1 * | 4/2004 | Yamaura | 427/540 |
| 2002/0048702 A1 * | 4/2002 | Yamaura et al. | 429/42 |
| 2004/0062971 A1 * | 4/2004 | Nuber | 429/33 |

FOREIGN PATENT DOCUMENTS

| | | |
|---|---|---|
| EP | 1 071 149 | 1/2001 |
| EP | 1071149 A2 * | 1/2001 |
| EP | 1354864 A1 * | 10/2003 |
| JP | 03-167712 | 7/1991 |
| JP | 11-258796 | 9/1999 |
| JP | 2000-256007 | 9/2000 |
| JP | 2003-303513 | * 10/2003 |
| WO | WO 01/06519 | 1/2001 |

OTHER PUBLICATIONS

B.L. Tumanskii et al. "ESR study spin-adducts of phosphoryl radicals with methano [60] fullerenes", Russian Chemical Bulletin, 2000, vol. 49, No. 5, pp. 843 to 846.

Liming Dai et al. "Doping of conducting polymers by sulfonated fullerene derivatives and dendrimers", J. Phys. Chem, B, 1998, vol. 102, No. 21, pp. 4049 to 4053.

Long Y. Chiang et al., "Efficient Synthesis of Polyhydroxylated Fullerene derivatives via Hydrolysis of Polycyclosulfated Precursors", J. Org. Chem., 1994, vol. 59, No. 14, pp. 3960 to 3968.

* cited by examiner

*Primary Examiner*—David W. Wu
*Assistant Examiner*—Henry S. Hu
(74) *Attorney, Agent, or Firm*—Bell, Boyd & Lloyd LLC

(57) ABSTRACT

A fullerene-based proton conductor including a proton conductive functional group connected to the fullerene by an at least partially fluorinated spacer molecule. Also, a polymer including at least two of the proton conductors that are connected by a linking molecule. Further, an electrochemical device employing the polymer as a proton exchange membrane, whereby the device is able to achieve a self-humidifying characteristic.

20 Claims, 10 Drawing Sheets

FULLERENE-BASED PROTON CONDUCTIVE MATERIALS

RELATED APPLICATION DATA

The present application is a divisional of U.S. patent application Ser. No. 10/115,109, filed on Apr. 1, 2002, herein incorporated by reference. The present application claims priority to Japanese Patent Document P2002-028642 filed on Feb. 5, 2002, herein incorporated by reference.

BACKGROUND OF THE INVENTION

The present invention relates to a proton conductor, a production method thereof, a polymer made of proton conductors, methods of making the polymer, and an electrochemical device using the polymer of proton conductors.

One of the most widely used proton conductors is Nafion, which is a perfluorinated sulfonic acid functionalized polymer. The structure of Nafion is shown in FIG. 3, and can essentially be divided in two substructures: i) a perfluorinated linear backbone 12; and ii) perfluorinated side chains 14 bearing sulfonic acid functions, i.e., the proton delivering sites. It combines an acceptable proton conductivity with an extreme inertness against chemical as well as thermal influences.

In addition, known fullerene compounds include, for example, compounds 1 through 6 (see FIGS. 4A–F) bearing acidic functional groups like sulfuric acid esters ($-OSO_3H$) or sulfonic acid groups ($-SO_3H$) that are capable of conducting protons within their solid-state structure. These proton-delivering sites can either be attached directly to the fullerene core or via various spacer molecules. Depending on the amount of water contained within the crystal, these compounds show proton conductivities higher than $10^{-2}$ S/cm. However, these fullerene-based materials suffer from several disadvantages. The most striking one is a lack of resistance to thermal and/or chemical decomposition. As an example, the butyl-linked fullerosulfonic acid (compound 6, FIG. 4F) first starts to decompose at about 100–110° C. Yet, thermal and chemical stability are prerequisites for any compound used in a fuel cell application.

Accordingly, there exists a need to provide materials that can be effectively and readily made and used as proton conductors for a variety of difference applications.

SUMMARY OF THE INVENTION

One advantage of the present invention is to overcome the above-noted disadvantages in the related art. More particularly, it is an advantage of the present invention to provide a proton conductive compound that has high proton conductivity, and that is thermally as well as chemically stable under conditions found in a fuel cell.

Another advantage of the present invention is to provide a proton conductor having an increased proton conductive performance.

Still another advantage of the present invention is to provide a fullerene-based proton conductive material that is thermally and chemically stable under conditions found in a fuel cell. More particularly, it is an advantage of the present invention to provide a fullerene-based proton conductive material that has a thermal stability on the order of 200° C. as measured by temperature programmed desorption (TPD), whereby it can be used in an application environment of about 80° to about 90° C. over a practical useful lifetime.

Yet another advantage of the present invention is to provide methods of manufacturing the above-described proton conductor, as well as a polymer film thereof. And another advantage of the present invention is to provide an electrochemical device having an acceptable conductance, self humidifying characteristics, as well as an increased thermal and chemical stability.

In an embodiment, the present invention attains the above and other advantages by connecting a proton conductive functional group to a fullerene molecule by a spacer molecule that is at least partially fluorinated.

More particularly, the present invention achieves a high proton conductivity because these fullerene-based proton conductors have a high number of proton conductive groups per unit of atomic weight. That is, as a non-limiting example, Nafion usually includes one proton delivering site per about 1,100 units of atomic weight, whereas a $C_{60}$ fullerene molecule carrying an average of ten proton conductive groups would increase this ratio about three times (i.e., it would have an average of one proton delivering site per about 370 units of atomic weight), which results in a considerable enhancement of the proton conductive group to weight ratio.

Further, the fullerene-based proton conductors of the present invention have at least a partially fluorinated spacer molecule connecting a proton conductive functional group to the fullerene back bone, whereby the present invention achieves a higher thermal and chemical stability than that of the previous fullerene-based proton conductors known within Applicants' company.

Moreover, in an embodiment, the above-noted advantages of the invention are achieved by providing a proton conductor comprising:

a fullerene molecule;

a spacer molecule attached to said fullerene molecule, wherein said spacer molecule is an at least partially fluorinated molecule; and a proton conductive functional group attached to said spacer molecule.

The above-noted advantages of the invention also are achieved by providing a polymer comprising:

a plurality of proton conductors as set forth above; and at least one linking molecule connected between two of the plurality of proton conductors.

Additionally, in a further embodiment, the above-noted advantages of the invention are achieved by providing a method of making a proton conductor, comprising:

a first step of combining a fullerene with a spacer-molecule precursor to form a first reaction product, wherein the spacer-molecule precursor is at least partially fluorinated;

a second step of hydrolyzing the first reaction product so as to form a second reaction product; and a third step of protonating the second reaction product so as to form a proton conductor that includes a proton conductive functional group attached to said fullerene by a spacer molecule that is formed from said spacer-molecule precursor and that is at least partially fluorinated.

Further, in an additional embodiment, the above-noted advantages of the invention are achieved by providing a method of making a proton conductive polymer film, comprising the steps of a first step of combining fullerenes with spacer-molecule precursors to form a plurality of first reaction products, wherein each of the spacer-molecule precursors is at least partially fluorinated;

a second step of combining the first reaction products with linking-molecule precursors so as to form second reaction products, wherein each of the second reaction products includes at least two of the first reaction products that are connected by a linking molecule formed from one of the linking-molecule precursors; and a third step of protonating the second reaction products so as to form a network of proton conductors that each includes a proton conductive functional group attached to the fullerene by a spacer molecule that is formed from the spacer-molecule precursor and that is at least partially fluorinated.

Lastly, in an embodiment, the present invention achieves an electrochemical device having an increased thermal and chemical stability, by employing therein a proton exchange membrane including the above-described proton conductor.

Additional features and advantages of the present invention are described in, and will be apparent from, the following Detailed Description of the Invention and the figures.

DETAILED DESCRIPTION OF THE INVENTION

Figure 1:
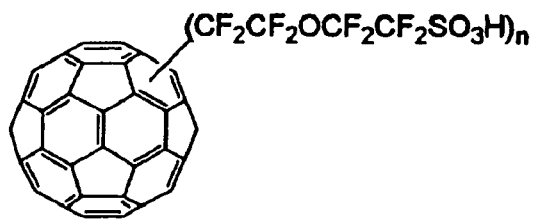
FIGS. 1A–D show various examples of proton conductors according to an embodiment of the present invention.
Figure 1:
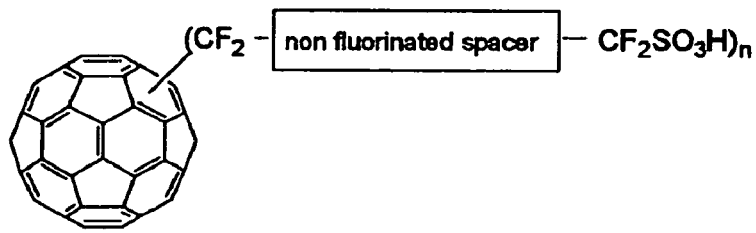
Figure 1:
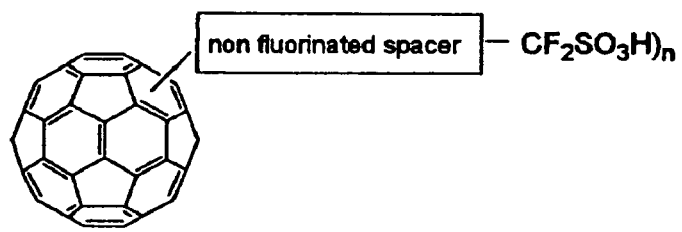
Figure 1:
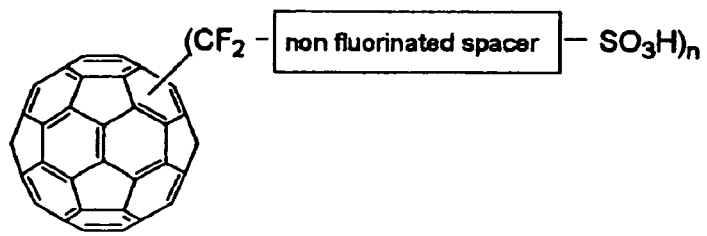

The present invention is embodied in a fullerene molecule having attached thereto at least one spacer molecule that, in turn, is attached to a proton conductive functional group. There may be more than one spacer molecule and more than one proton conductive functional group per fullerene. Further, although it is more usual to have each of the spacer molecules and each of the proton conductive functional groups be the same on each fullerene, such is not necessary. That is, each fullerene may include a plurality of different spacer molecules. Similarly, a plurality of different proton conductive functional groups may be attached to a fullerene by the same type, or a different type, of spacer molecule.

In general, a fullerene is a molecule made of carbon atoms and having a more or less spherical shape. As the fullerene molecule in the present invention, any of the known fullerene molecules can be used. For example, fullerenes are exemplified by $C_{36}$, $C_{60}$, $C_{70}$, $C_{76}$, $C_{78}$, $C_{82}$, $C_{84}$, $C_{90}$, $C_{96}$, etc., all the way to $C_{266}$. Presently, because they are readily commercially available at a reasonable price, and generally because as the fullerene size increases its reactivity decreases, $C_{60}$ and $C_{70}$, or a mixture thereof, are the preferred fullerenes. The use of fullerene molecules provides an increased mobility of protons because the fullerene molecules have a uniform shape that is independent from the direction in which the proton carriers are moving, thereby leading to a high proton conductive performance in the present invention. Further, the present invention achieves a high proton conductivity because the fullerenes have a high number of proton conductive groups per unit of atomic weight.

Although not necessary, the fullerene molecule may have attached thereto additional functional groups such as, for example: halides (F, Cl, Br); alkyl and/or aryl groups; fully, partially, or non, fluorinated hydrocarbons; or other functional groups, such as ethers, esters, amides, ketones, and other suitable materials. These additional groups may have a stabilizing impact on the material as, for example, against radicals present in a fuel cell device. Also, these additional groups may cause an enhancement of the proton conductivity through effects caused by the electro negativity of the fluorine atoms, and/or through the segregation of water contained in the solid into the hydrophilic areas around the acetic groups away from the hydrophobic fluorinated parts. However, the presence of these additional functional groups reduces the number of spacer molecules that can be attached to the fullerene and, in turn, reduces the number of proton conductive functional groups that may then be attached thereto. Therefore, it is preferred that the fullerene molecule not have such additional functional groups attached thereto, whereby the number of spacer molecules, and thus proton conductive functional groups, can be optimized. However, because the proton conductor of the present invention is largely water soluble as a molecule, it is beneficial to form a polymer by cross-linking the fullerene molecules that have the spacer molecules and the proton conductive groups attached thereto. Therefore, the number of spacer molecules attached to the fullerene molecule must be balanced with the need also to attach linking molecules thereto in order to form a cross-linked polymer, as discussed later.

A spacer molecule of the present invention may be an alkyl or aryl, and is at least partially fluorinated. It is the presence of an at least partially fluorinated spacer molecule that gives the overall proton conductor its increased thermal and chemical stability. In a preferred embodiment of the present invention, the spacer molecule is a fully, or partially, fluorinated compound including, for example, hydrocarbon chain or combination thereof that may include other atoms, or groups. As a non-limiting example, a spacer molecule of the present invention may include: a partially fluorinated hydrocarbon chain; a perfluorinated hydrocarbon chain; $(C_nF_{2n})$, wherein n is a natural number; a partially, or fully, fluorinated aromatic structure (i.e., the fluorinated portion of the spacer need not be restricted to the $CF_2$ alkyl type); or $CF_2—CF_2—O—CF_2—CF_2$, as shown in compound 7 of FIG. 1A. Generally, the more fluorine atoms in a spacer molecule, the more stable it will be, but stability also depends on the position of the F and H atoms in the case of partial fluorination. Presently, $CF_2$—$CF_2$—O—$CF_2$—$CF_2$ is preferred because it is very stable, and is readily commercially available. However, partially fluorinated spacers may be advantageous because they may be less costly than their perfluorinated counterparts, and may offer sufficient stability for use in a fuel cell. That is, for example, as shown in FIGS. 1B–D, a spacer molecule may include: a non-fluorinated spacer portion having a $CF_2$ molecule on each of its ends, as in compound 8, FIG. 1B; a non-fluorinated spacer portion connected between a fullerene and a $CF_2$ molecule, as in compound 9, FIG. 1C; or a non-fluorinated spacer portion connected on one of its ends to the fullerene by a $CF_2$ molecule whereas it is connected directly to a proton conductive group on its other end, as in compound 10, FIG. 1D. Additionally, a spacer molecule of the present invention may include, optionally attached thereto, other functional groups such as, for example, ethers, esters, ketones, or combination thereof.

A proton conductive function group of the present invention may be any of the known proton conductive function groups. More specifically, a proton conductive function group of the present invention may be: an acidic function group; a sulfuric acid ester; a sulfonic acid group; a phosphoric acid ester; or a carboxylic acid group; or a sulfonamide (—$SO_2NH_2$), or other suitable compounds. Generally, however, the stronger the acid, the better. Therefore, the sulfonic acid group is preferred.

The proton conductors of the present invention can be made by any suitable process. The following is an exemplary process for synthesizing the proton conductors of the present invention.

In general, a fullerene is first combined with a spacer-molecule precursor to form a first reaction product. Generally, the spacer-molecule precursor includes a docking end that attaches to the fullerene molecule, and a functional-group-precursor end on which the proton conductive functional group will eventually be formed. Then, the first reaction product is hydrolyzed, resulting in a second reaction product for accepting protons. Lastly, the second reaction product is then protonated to yield a third reaction product that is the target compound, i.e., the proton conductor of the present invention.

More specifically, but still as a non-limiting example, the following process steps may be followed to synthesize the proton conductors of the present invention.

First, a fullerene is combined with a spacer-molecule precursor in a solvent. In general, the spacer-molecule precursor is of the formula:

X—$R_F$—Y, wherein:

X is Cl, Br, or I;

RF is a fully, or partially, fluorinated spacer. Further, it may contain attached thereto other functional groups such as ethers, esters, phosphoric acid esters, and/or carboxylic acids; and Y is a functional group that will undergo further reaction to transform it into a proton conductive functional group.

Also in general, the solvent mixture is such that it is capable of dissolving the desired reaction product, but not of readily dissolving the fullerene and low adducts, whereby the desired reaction product may easily be separated from the side products and unreacted fullerene by filtering or centrifuge techniques.

The fullerene, spacer-molecule precursor, and solvent, mixture is then subject to a predetermined activation energy, such as a predetermined reaction temperature for a predetermined reaction time. The predetermined activation energy may be supplied by any suitable method such as, for example, by heating, by application of light (either UV or visible), and the like. A first reaction product is produced by the combination of the spacer-molecule precursor and the fullerene. That is, the general formula of the first reaction product is --fullerene-$R_F$—Y--(as used herein, double hyphens are used to offset descriptive chemical designations). The unreacted fullerene, and any unwanted byproducts that are insoluble in the solvent (as low adducts, for example), are then filtered out.

Second, the filtered first reaction product is hydrolyzed with bases such as, for example: MOH, where M is an alkali; carbonates such as $M_2CO_3$, wherein M is an alkali; or carbonates such as $MCO_3$, wherein M is an alkali earth. This produces a second reaction product of the general formula --fullerene-$R_F$-hydrolyzed molecule--. Additionally, after this hydrolyzing process, there remains an excess amount of base that is removed from the second reaction product by chromatography.

Third, the second reaction product is then protonated to form a third reaction product of the general formula --fullerene-$R_F$-proton conductive functional group--. This is the target proton conductor of the present invention. The second reaction product may be protonated by any suitable method such as, for example, use of cation exchange, or the use of a strong inorganic acid.

The following is a non-limiting example of the above-described method of making a proton conductor.

First, one equivalent of $C_{60}$ was combined with 24 equivalents of I—$CF_2$—$CF_2$—O—$CF_2$—$CF_2$—$SO_2F$ (a spacer-molecule precursor) and a 1:1 $C_6F_6/CS_2$ solvent mixture. The amount of $CS_2$ was about 7.9 mm/mg $C_{60}$, and the amount of $C_6F_6$ was the same. The solution temperature was then raised to about 200° C. for about 94 hours, whereupon greater than 70% of the reactants were reacted. Because the $C_6F_6/CS_2$ solvent mixture boils at about 50° C., this step was performed under a pressure higher than atmospheric, as in an autoclave, for example. Within the spacer-molecule precursor, the I side was the docking side that, upon removal of the I, became attached to the fullerene molecule. The $SO_2F$ side of the spacer-molecule precursor would then undergo further reaction, in later steps, thus transforming it into a proton conductive functional group. If the solvent includes only $C_6F_6$, which precipitates the fullerenes, such would result in an unduly high percentage of $C_{60}$ left unreacted. Therefore, the solvent also included a component, such as $CS_2$, in which the fullerene dissolves. But the first reaction product is soluble in $C_6F_6$ and, therefore, such was also used to make it easy to separate the first reaction product from the unreacted $C_{60}$.

Neither the temperature, nor the reaction time are critical, and can vary depending upon circumstances. Therefore, as long as the reaction is carried out, higher temperatures can be used with shorter times and, similarly, lower temperatures can be used with longer times. In most cases, a higher temperature will lead to a greater number of spacer molecules per fullerene. But in no case should the reaction temperature exceed the temperature at which the spacer-molecule precursor begins to decompose. However, if too many spacer molecules are attached to the fullerene, then there are a reduced number of sites for attachment of a linking molecule during certain methods of polymerization, as discussed below. Also, if the reaction temperature is too high, undesirable side reactions occur. Further, the more spacer molecules that are attached, then the more proton conductive groups there will be, which leads to an increased proton conductivity but also to an increased water solubility (which is undesirable). Therefore, the temperature is selected to give an optimum balance of proton conductivity, and available sites for linking molecules, while minimizing side reactions. If there are enough sites for linking molecules, the polymer can be made water insoluble even though a single proton conductor is water-soluble. The reaction temperature can be achieved by heating. Alternatively, instead of or in addition to heating, other suitable activation energies can be used such as, for example, light energy such as visible or ultraviolet light. Thus, for the above-described exemplary reaction, the preferred temperature range is from about 190° C. to about 240° C., with a reaction time of about 94 hours.

The result of the first step, in this exemplary embodiment, was a plurality of first reaction products of the formula $C_{60}$—$(CF_2$—$CF_2$—$O$—$CF_2$—$CF_2\ SO_2F)_n$ and about 5% to about 7% unreacted $C_{60}$ (unless stated otherwise, all letters represented in subscript or superscript represent natural numbers). The unreacted $C_{60}$, and other unwanted byproducts that were insoluble in the solvent, were then filtered out.

Second, the first reaction products $C_{60}$—$(CF_2$—$CF_2$—$O$—$CF_2$—$CF_2\ SO_2F)_n$ were hydrolyzed by reacting them with NaOH in a hydrolyzing step. The solution used in this step, to hydrolyze the first reaction product, included $C_6F_6$, THF, and NaOH. The $C_6F_6$ was used to get the first reaction product into solution, because a dry first reaction product does not dissolve readily in THF. The amount of $C_6F_6$ can vary, there is no strict proportion, as long as there is enough to form a solution with the first reaction product. However, water is completely insoluble in $C_6F_6$. Therefore, in order to get both the NaOH, and the first reaction product into solution, THF was used in combination with the $C_6F_6$, the first reaction product, and the NaOH. As preferred, the solution used in this step included just enough $C_6F_6$ to get the first reaction product into solution, an amount of THF that was equal to about 10 to about 20 times the volume of the first reaction product in $C_6F_6$, and about 1/10 to 1/20 of the Volume of $C_6F_6$+THF of 1 mol/liter of NaOH per one equivalent of fullerene ($C_{60}$ in this exemplary embodiment). The smallest amount of NaOH that is conceivable (assumed a 100% reaction) is one NaOH per one —$SO_2F$ group, i.e., with estimated eight —Rf—$SO_2F$ adducts attached per $C_{60}$ it is at least 8 eq. However, since it is easier one will always work with an excess of NaOH high enough to assure 100% hydrolyzing and low enough to easily remove the excess NaOH. Because strict proportions are not necessary to carry out this reaction, this method easily can be scaled-up, thereby facilitating production of the proton conductors in large quantities. The hydrolyzing step produced a plurality of second reaction products, each of the general formula $C_{60}$—$(CF_2$—$CF_2$—$O$—$CF_2$—$CF_2$—$SO_3Na)_n$, where n is a natural number, along with water and excess NaOH.

If the second reaction product and the byproducts (including excess NaOH) are run through a silica gel column using water only, then the resulting solution will be basic, but this is undesirable. Therefore, the solution was run through a silica gel column including THF and water, in a 1:1 ratio, to remove the excess NaOH and to produce a neutral solution that includes the desired second reaction products, which are very water-soluble. At this point, the solvent (THF and water) was removed.

Third, the second reaction product was protonated to form a third reaction product, i.e., a target compound. After the solvent had been removed in the above step, a solution was made with the second reaction products and water. This solution was then put over an ion exchange column, wherein H was substituted for Na in each of the second reaction products, thereby forming a plurality of the third reaction products having the general formula $C_{60}$—$(CF_2$—$CF_2$—$O$—$CF_2$—$CF_2$—$SO_3$—$H)_n$, where n is a natural number.

The protonation can be performed by: a cation exchanger; by employing a strong inorganic acid such as HCl, $H_2SO_4$, $HClO_4$, or $HNO_3$; or any other suitable method. These third reaction products were excellent proton conductors having a thermal and chemical stability greater than that of the fullerene-based proton conductors discussed in the background of the invention. However, these proton conductors were very soluble in water. Therefore, in order to use these proton conductors in a fuel cell wherein water is present, it is beneficial to polymerize the proton conductors in order to increase their stability in water.

Although the number n is currently not controllable, when the fullerene is $C_{60}$, the average number of n throughout the above-described exemplary-embodiment steps is about 6 to about 8, which gives good proton conductivity. Also, about 6 to about 8 spacer molecules per $C_{60}$ fullerene allows a sufficient number of sites on the $C_{60}$ fullerene for linking molecules that are used to polymerize the proton conductors in certain polymerization methods.

Figure 4:
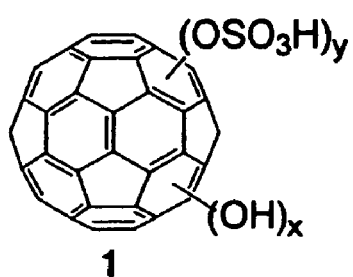
FIGS. 4A–F show various fullerene-based proton conductive known in the art.
Figure 4:
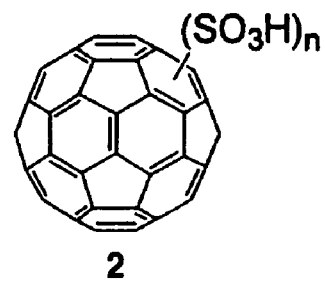
Figure 4:
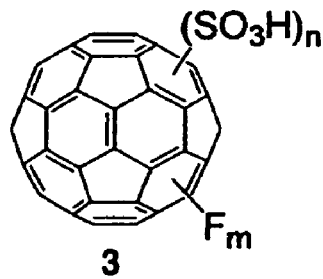
Figure 4:
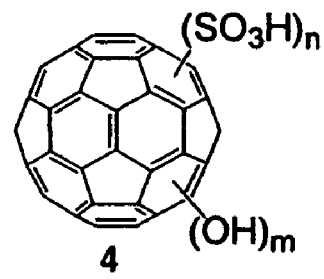
Figure 4:
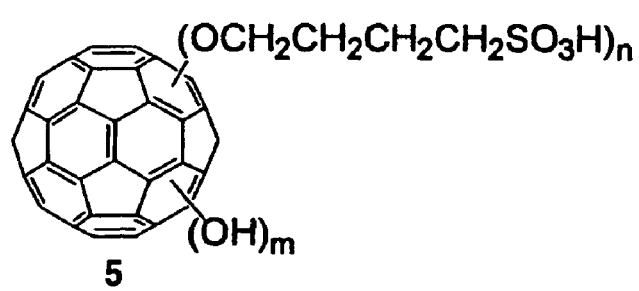
Figure 4:
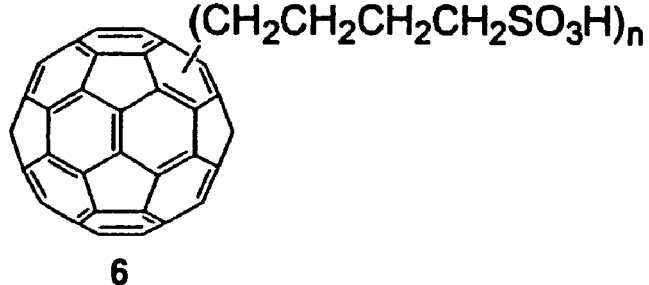

In this exemplary embodiment, the third reaction product showed a decomposition temperature (as measured by TPD) of about 170° C. to about 180° C., which is higher than that of compound 6 (100–110° C.) in FIG. 4F. Additionally, the third reaction product showed a proton conductivity ($2.4 \times 10^{-5}$ at 20° C., $2.0 \times 10^{-3}$ at 85° C., $1.1 \times 10^{-3}$ at 95° C., and $7.9 \times 10^{-4}$ at 105° C., all in S/cm) higher than that of compound 6 ($2.1 \times 10^{-6}$ at 20° C., $4.8 \times 10^{-4}$ at 85° C., $3.8 \times 10^{-4}$ at 95° C., and $3.4 \times 10^{-4}$ at 105° C., proton conductivity data is measured in S/cm) in FIG. 4F, wherein conductivity was measured after drying the samples overnight at 50° C. in an oil pump vacuum (producing about 0.001 mbar). Although the third reaction product's decomposition temperature was less than that of Nafion, such was also measured for the third reaction product as a molecule whereas that of Nafion was measured for a polymer. Therefore, the comparison is not an entirely true one, and one would expect the third reaction product to show an increased stability when used as a polymer. Also, when used in the form of a polymer, the proton conductors will desirably become water insoluble.

In order to use the proton conductors of the present invention in a polymer framework, they are cross-linked by cross-linking molecules. A cross-linking molecule includes one, and preferably more than one, of the following characteristics: a fully, or partly, fluorinated molecule; an alkyl and/or aryl group; a length longer than that of the protonated spacer molecule; and other functional groups such as ethers, esters, amides, and/or ketones.

As noted above, for certain polymerization methods, it is beneficial to balance the number of cross-linking molecules per fullerene with the number of spacer molecules (which, in turn, are linked to the proton conductive function groups) per fullerene so as to achieve an optimization of proton conductivity as well as thermal and chemical stability (including water insolubility) of the polymer as a whole. The polymerization may be carried out as an additional step, between the first step of attaching a spacer-molecule precursor to a fullerene, and the third step of protonating the spacer-molecule precursor. Alternatively, the polymerization may be carried out in a one-pot reaction along with the first step of adding a spacer-molecule precursor to the fullerene.

As an example of polymerization by an additional step, the following process may be used in connection with the above-described exemplary process of making a proton conductor. Once the first reaction product, for example, $C_{60}$—$(CF_2$—$CF_2$—$O$—$CF_2$—$CF_2$ $SO_2F)_n$ is produced, it is then reacted with a bifunctional linking-molecule precursor of the general formula:

X—R—X, wherein:

X is Cl, Br, or I; and

R is a molecule having one or more of the following characteristics: an alkyl and/or aryl group: fully, or partly, fluorinated; a length longer than that of the protonated spacer molecule; and other functional groups such as, for example, ethers, esters, amides, ketones, and acid functional groups.

Figure 5:
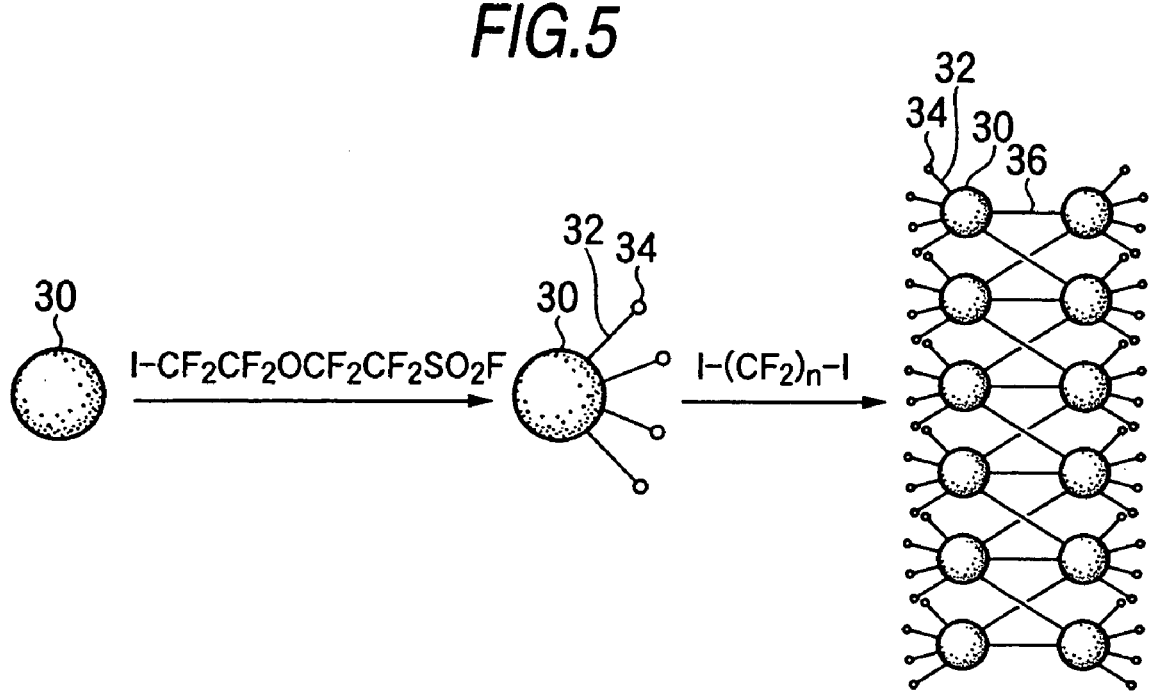
FIG. 5 is a schematic representation of a method for the polymerization of a proton conductor according to an embodiment of the present invention.

The bifunctional molecule, upon reacting with the first reaction product, forms bonds between fullerene molecules, thereby acting as a linking molecule to link two fullerene molecules together into a polymer. See FIG. 5 for a schematic representation of this polymerization method and a polymer formed of proton conductors, according to this embodiment of the present invention. As shown in FIG. 5, the fullerenes 30 have proton-conductive-group precursors 34 attached thereto by spacer molecules 32. The proton-conductive-group precursors 34 are —$SO_2F$, whereas the spacer molecules 36 are $CF_2$—$CF_2$—$O$—$CF_2$—$CF_2$. Linking molecules 36 connect the fullerenes 30 into a polymer, wherein the linking molecules 36 are —$(CF_2)_n$— and n is a natural number of 6 or more, preferably 6 or 8. This reaction is carried out with a sufficient activation energy to make the reaction work, wherein the activation energy can be achieved by any suitable manner such as, for example, the addition of heat, UV light, visible light, and the like. The polymer is then protonated as described above.

In an exemplary embodiment of the method of forming a polymer matrix of proton conductors, 100 mg of the first reaction product $C_{60}$—$(CF_2$—$CF_2$—$O$—$CF_2$—$CF_2$ $SO_2F)_n$ was reacted with excess linking-molecule precursor I—$(C_8F_{16})$—I.

Although I—$(C_8F_{16})$—I was used as the linking-molecule precursor for $C_{60}$—$(CF_2$—$CF_2$—$O$—$CF_2$—$CF_2$ $SO_2F)_n$, I(—$(C_nF_{2n})$—I could also be used, wherein n is a natural number of 6 or more, as such would produce a linking molecule longer than the protonated spacer. Generally, the more fluorine atoms that are present in the linking molecule, the more water insoluble the polymer network will be. But stability also depends on the positions of F and H atoms in the case of a partially fluorinated linking molecule precursor. Further, instead of having an iodine atom on either end of the linking-molecule precursor, it is also possible to use other halogens such as, for example, chlorine or bromine. The main consideration for selecting a linking-molecule precursor is that such should include one or more of the following properties: produces a linking molecule having water insolubility; produces a linking molecule that has high stability in the thermal and chemical environments typically found in a fuel cell; produces a linking molecule that has ability to form a self standing film; at least two docking sites; and easy reactivity with fullerene molecules. Further, although any length linking-molecule precursor could be used, it is preferable to have the linking-molecule precursor be such that it produces a linking molecule that is longer than the protonated spacer molecule.

For this example, the $(C_8F_{16})$ linking molecule was selected because it is stable in the thermal and chemical environments found in a typical fuel cell, has an ability to produce self standing films, provides water insolubility. Further, such linking molecule was selected because the precursor molecule I—$(C_8F_{16})$—I is commercially available, easily reacts with $C_{60}$, and produces a linking molecule that is longer than the protonated spacer molecule produced by the I—$CF_2$—$CF_2$—$O$—$CF_2$—$CF_2SO_2F$ spacer-molecule precursor as used in the above-described exemplary embodiment of the method for forming a proton conductor.

As an example of polymerization by a one-pot reaction, the following process may be used in connection with the above-described exemplary process of making a proton conductor. During the first step of producing the first reaction product $C_{60}$—$(CF_2$—$CF_2$—$O$—$CF_2$—$CF_2$—$SO_2F)_n$, a simultaneous reaction is carried out with a bifunctional linking-molecule precursor of the general formula:

X—R—X wherein:

X is Cl, Br, or I; and

R is a molecule having one or more of the following characteristics: an alkyl and/or aryl group; fully, or partly, fluorinated; a length longer than that of the protonated spacer molecule: and other functional groups such as, for example, ethers, esters, amides, ketones, and acid function groups.

Figure 6:
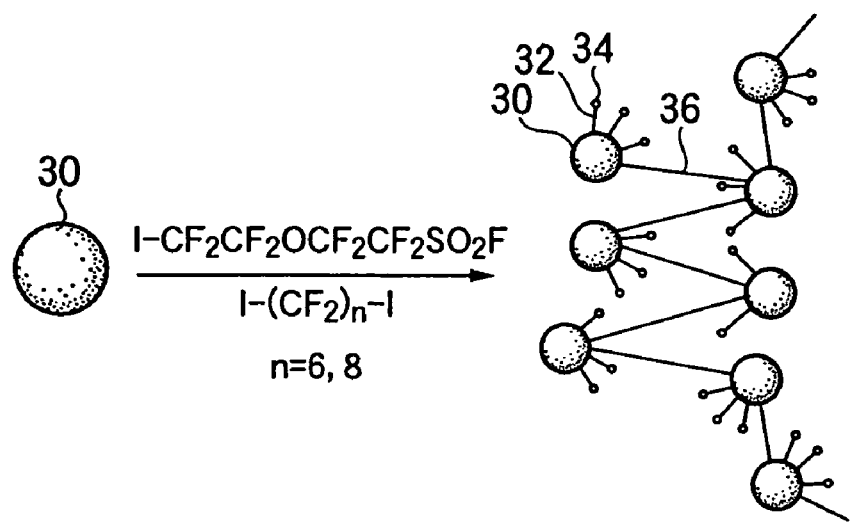
FIG. 6 is a schematic representation of a method for the polymerization of a proton conductor or by a one-pot reaction according to an embodiment of the present invention.

That is, fullerenes are reacted with both spacer-molecule precursors, and with the bifunctional linking-molecule precursors simultaneously to form first reaction products that are linked together into a polymer. Again, this reaction is carried out with a sufficient activation energy to make the reaction work, wherein the activation energy can be achieved by any suitable manner such as, for example, the addition of heat, UV light, visible light, and the like. See FIG. 6 for a schematic representation of this polymerization method and a polymer formed of proton conductors. As shown in FIG. 6, fullerenes 30 have proton-conductive-group precursors 34 attached thereto by spacer molecules 32. Linking molecules 36 connect the fullerenes 30. The first reaction products that are linked together into a polymer are then hydrolyzed, and protonated to form a proton conductive polymer.

In an exemplary embodiment of this one-pot method of forming a polymer network of proton conductors, 357 mg of $C_{60}$ in 40 ml $CS_2$ was mixed with 40 ml $C_6F_6$, 5.0 g of I—$CF_2$—$CF_2$—$O$—$CF_2$—$CF_2$—$SO_2F$ (i.e equivalents), and 7.77 g I—$(CF_2)_8$—I (i.e., 24 equivalents).

The solution was then heated in an autoclave to 200° C. for 96 hours. After cooling the reacted mixture, the solvent was removed, thereby forming a cross-linked first reaction product.

The cross-linked first reaction product was then hydrolyzed as follows. The cross-linked first reaction product was put into solution with 5 ml $C_6F_6$, was diluted with about 85 ml THF, and was stirred overnight with 6 ml of 1 M NaOH. After phase separation, the fullerene-containing organic layer-in contrast the non-cross linked, and thus water soluble, fullerene sodium sulfonate is exclusively present in the aqueous layer-was filtered through a short silica gel column (with THF as an eluent) in order to remove any remaining NaOH. The hydrolyzed-cross-linked first reaction product obtained after removing the solvent was water insoluble but was soluble in less polar solvents like methanol, THF, etc.

The hydrolyzed-cross-linked first reaction product was then dissolved in 20 ml MeOH, was diluted with 80 ml $H_2O$ (no precipitation was observed using this solvent mixture), and was protonated via an ion exchange column.

After drying overnight at 80° C., 1.8 g of acidic water-insoluble material was obtained. This was the target proton conductive polymer.

For large reaction amounts, in either the additional step or one-pot methods, it may be advisable to add an additional purification step after the step of adding activation energy. The additional purification step is useful in removing the iodine that is formed along with the product in the reaction since large amounts of 12 cannot be removed simply by heating the material in vacuo. An example of this additional purification step is as follows.

To purify the compound a $C_6F_6$/THF solution was shaken out with 1M sodium thiosulfate ($Na_2S_2O_3$) in $H_2O$. The $C_6F_6$/THF solution was prepared analogously to the one used for the hydrolyzation of the fullerenesulfonyl fluoride with 1 M NaOH. Removing the salts was simple because the system $C_6F_6$/THF/1M $Na_2S_2O_3$ was a two-phase system in which, after the reaction, the salts, i.e., excess $Na_2S_2O_3$, NaI, and $Na_2S_4O_6$ (the latter two being formed by reaction of sodium thiosulfate with $I_2$-were in the water layer. The organic phase containing the iodine-free fullerene sulfonyl fluoride was separated, the solvent was removed, and the material was dried overnight in vacuum (0.001 mbar) at 120° C.

Again, although I—$(C_8F_{16})$—I was used as the linking-molecule precursor for $C_{60}$—$(CF_2$—$CF_2$—O—$CF_2$—$CF_2$—$SO_2$—F$)_n$, I—$(C_nF_{2n})$—I could also be used, wherein n is a natural number of 6 or more, as such would produce a linking molecule longer than the protonated spacer. In fact, for the one-pot reaction polymerization method, the linking-molecule precursor I—$(C_6F_{12})$—I is preferred over I—$(C_8F_{18})$—I, because the former produces a higher conductivity in the polymer. Further, instead of having an iodine atom on either end of the linking-molecule precursor, it is also possible to use other halogens such as, for example, chlorine or bromine. Again, the main consideration for selecting a linking-molecule precursor is that such should include one or more of the following properties: produces a linking molecule having water insolubility; produces a linking molecule having high stability in the thermal and chemical environments typically found in a fuel cell; produces a linking molecule having an ability to form self standing films; at least two docking sites; and readily reacts with fullerene molecules. Further, although any length linking-molecule precursor could be used, it is preferable to have the linking-molecule precursor be such that it produces a linking molecule that is longer than the proponated spacer molecule.

For this example, $(C_8F_{16})$ linking molecule was selected because it is stable in the thermal and chemical environments found in a typical fuel cell, has an ability to produce self standing films, provides water insolubility. Further, such linking molecule was selected because the precursor molecule 1-$(C_8F_{16})$—I is commercially available, easily reacts with $C_{60}$, and produces a linking molecule that is longer than the protonated spacer molecule produced by the I—$CF_2$—$CF_2$—O—$CF_2$—$CF_2$—$SO_2$F spacer-molecule precursor as used in the above-described exemplary embodiment of the method for forming a proton conductor.

As an alternate example of polymerization by an additional step, and as an example of protonation by strong acid, the following process may be used.

First, once the first reaction product $C_{60}$—$(CF_2$—$CF_2$—O—$CF_2$—$CF_2$—$SO_2$F$)_n$ is produced, it is then reacted with a bifunctional trimethylsilyl amide linking-molecule precursor of the general formula:

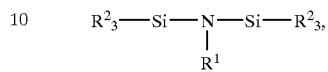

wherein:
$R^1$ is Li, Na, K, or Si—$R^2_3$; and
$R^2$ is an alkyl.

The bifunctional molecule, upon reacting with the first reaction product, forms bonds between spacer-molecule precursors that are attached to the fullerene, thereby acting as a linking molecule to link two fullerene molecules together into a polymer. This reaction is carried out with a sufficient activation energy to make the reaction work, wherein the activation energy can be achieved by any suitable manner such as, for example, the addition of heat, UV light, visible light, and the like. Further, this reaction is carried out in solvents like THF, dioxane, acetonitril, perfluoro benzene, or any other solvent capable of forming solutions with the respective reagents. The reaction can be performed at room or elevated temperatures and under atmospheric or elevated pressures, leading to second reaction products of the general formula:

[$R_f$-Fullerene-$CF_2CF_2OCF_2CF_2SO_2NR^1SO_2CF_2CF_2OCF_2CF_2$-Fullerene-$R_f$], wherein:

$R_f$ is —$CF_2CF_2OCF_2CF_2SO_2F$,
—$CF_2CF_2OCF_2CF_2SO_2NH_2$, and/or
—$CF_2CF_2OCF_2CF_2SO_2NR^1SiR^2_3$ and/or
—$CF_2CF_2OCF_2CF_2SO_2NR^1SO_2CF_2CF_2OCF_2$
$CF_2$—$C_{60}$—$R_f$ and/or

That is, unlike the bifunctional linking-molecule precursors of the previous two examples, this bifunctional linking molecule-precursor forms a linking molecule between spacer-molecule precursors that are attached to the fullerene; i.e., it does not attach to the fullerenes themselves. There can be, and generally are, two or more $R_f$ molecules per fullerene. Therefore, the products of this first step are —$SO_2NR^1SO_2$— linked fullerene subunits that bear various numbers of unreacted $R_f$ groups, wherein the $R_f$ groups include sulfonylfluoride sites as well as possible side products like sulfonamide and —$SO_2NR^1SiR^2_3$.

Figure 7:
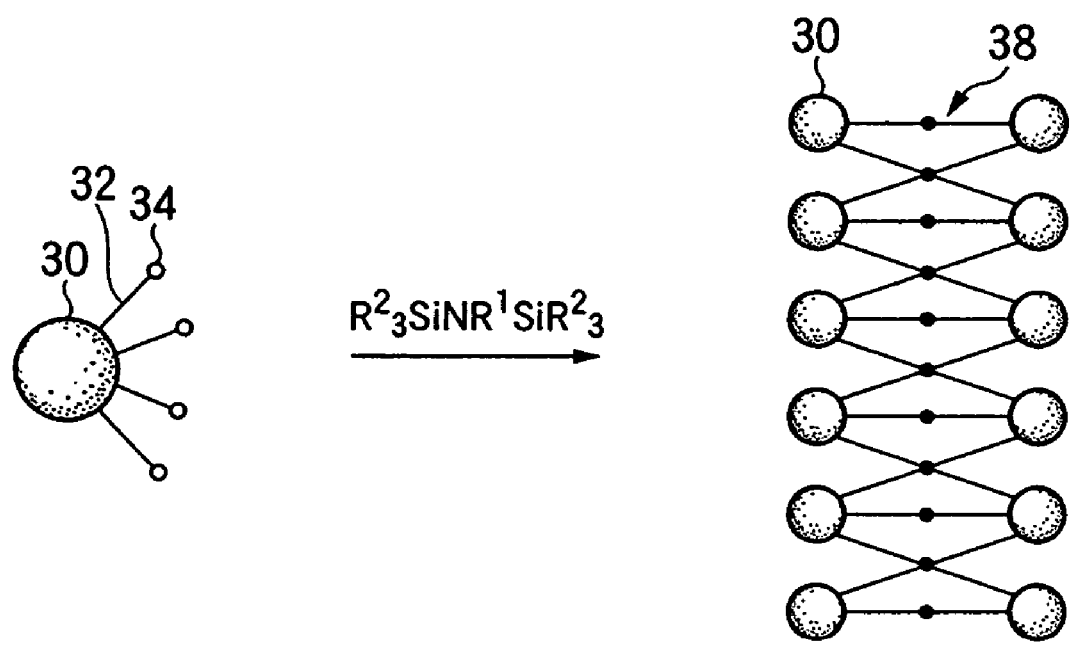
FIG. 7 is a schematic representation of another method for polymerizing by an additional step according to an embodiment of the present invention.

Second, the sulfonyl fluoride functional groups on the second reaction products are hydrolyzed by using bases such as, for example: MOH, wherein M is an alkali; carbonates ($M_2CO_3$, wherein M is an alkali; $MCO_3$, wherein M is an earth alkali whereby third reaction products are formed and have the general formula:

[$R_{f2}$-Fullerene-$CF_2CF_2OCF_2CF_2SO_2NR^1SO_2CF_2CF_2OCF_2CF_2$-Fullerene-$R_{f2}$], wherein:

$R_{12}$ is —$CF_2CF_2OCF_2CF_2SO_3M$,
—$CF_2CF_2OCF_2CF_2SO_2NH_2$,
—$CF_2CF_2OCF_2CF_2SO_2NR^1SiR^2_3$ and/or
—$CF_2CF_2OCF_2CF_2SO_2NHSO_2CF_2CF_2OCF_2$
$CF_2$—$C_{60}$—$R_{f3}$ This reaction step may be performed in aqueous solutions of the bases, or in mixtures with organic solvents. The latter may form a one-phase or a two-phase system with the former. Elevated temperatures may be employed. See FIG. 7 for a schematic representation of this polymerization method and a polymer formed of proton conductors. As shown in FIG. 7, fullerenes 30 having proton-conductive-group precursors 34 attached thereto by spacer molecules 32 are combined with trimethylsilyl amides ($-R^2{}_3-Si-N-R^1-Si-R^2{}_3-$) to form a polymer of fullerenes 30 linked by sulfonyl imide linkage 38 that is

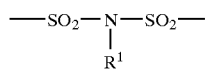

That is, the basic unit of the polymer is of the general formula [fullerene—spacer molecule—sulfonyl imide linkage—spacer molecule—fullerene].

Third, the third reaction products are protonated. For example, the third reaction products may be protonated by using an ion exchanger or strong inorganic acids like HCl, $H_2SO_4$, $HClO_4$, $HNO_3$, and the like. This reaction can occur at room or elevated temperatures, whereby the resulting, desired, polymer is of the general formula:

[$R_{f3}$-Fullerene-
    $CF_2CF_2OCF_2CF_2SO_2NHSO_2CF_2CF_2OCF_2CF_2$-
    Fulterene-$R_{f3}$]

wherein:

$R_{f3}$ is $-CF_2CF_2OCF_2CF_2SO_3H$, or
    $-CF_2CF_2OCF_2CF_2SO_2NHSO_2CF_2CF_2OCF_2$
    $CF_2-C_{60}-R_{f3}$. and/or
    $-CF_2CF_2OCF_2CF_2SO_2NHSO_2CF_2CF_2OCF_2$
    $CF_2-C_{60}$ In contrast to the two other above-described methods of polymerization, in this method the cross-linking is achieved not by employing extra linking units, but by using the acid precursor (i.e., the $-SO_2F$ functional group) as a docking site. The resulting sulfonyl imide ($-SO_2NHSO_2-$) itself shows strong acidity and can function as a proton-delivering site for $H^+$ conductivity. Non-reacted sulfonylfluoride ($-SO_2F$) left over from the first reaction step, as well as side products possibly obtained (i.e., $-SO_2NH_2$, $-SO_2NR^1SiR^2{}_3$) are converted into sulfonic acid groups during the course of the synthesis and contribute to the proton conductivity. Preliminary measurements shown high $H^+$ conductivity up to the order of $10^{-2}$ S/cm at room temperature depending on the amount of water contained in the solid. The material is insoluble in common solvents and in water, an important prerequisite for application in a fuel cell. Due at least in part to the at least partial fluorination of the spacer molecules of the first reaction products, the polymer achieves high thermal as well as chemical stability. TPD measurements showed thermal stability up to at least 200° C., which is on the order of the stability achieved by Nafion.

In an exemplary embodiment of this method of forming a polymer network of proton conductors, the following steps were carried out.

In the first reaction step, 0.5 ml of a 1 M THF solution of

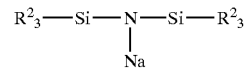

were added drop wise in an $N_2$ atmosphere and under ice cooling to 0.2 g of solid first reaction products $C_{60}-$ $(CF_2-CF_2-O-CF_2-CF_2\ SO_2F)_n$, and stirred at room temperature for 5 hours. A dark brown precipitate was formed and dried in vacuo at 60° C. for 3 hours. The resulting solid was dissolved in 8 ml dioxane and 0.1 g of first reaction products $[C_{60}-(CF_2-CF_2-O-CF_2-CF_2-SO_2-F)_n]$ in 2 ml THF were added via a dropping funnel. Then, after reflux for 18 hours, the solvent was removed and the obtained solid was washed with THF and water, resulting in 0.13 g of second reaction products as described above.

In the second reaction step, hydrolysis, the second reaction products were dispersed in 1M aqueous NaOH, and stirred at room temperature for 16 hours. After filtering, and washing with water, solid third reaction products remained.

In the third reaction step, protonation, the solid third reaction products were heated with 10% HCl to 60° C. for 12 hours. After filtering, and subsequent washing with 10% HCl and water, the desired proton conductive polymer was attained.

As described above, this method includes the use of first reaction products having perfluorinated spacers. However, the first reaction products may include partially fluorinated spacers instead.

The polymer according to this method can be used as a proton conductor in fuel cells, electrolysis cells, and capacitors, for example. The fullerene core may bear additional groups, such as: halides (F, Cl, and/or Br); alkyl and/or aryl groups; non, partially, or fully fluorinated molecules; ethers; esters; amides; and/or keto function groups.

Further, the polymer may be used in combination with compounds capable of enhancing its proton conductivity in the absence of water. For example, the compounds may include polymers such as polyalkyl ethers, polyethylene carbonates, polyacryl amides, polyvinyl alcohols, and polyethylene imines. Alternatively, or in addition to the polymers, the compounds may include polar solvents such as alkyl carbonates, ethylene carbonate, propylene carbonate, and the like. Still further, fully or partly fluorinated derivatives of these compounds may be used.

Moreover, the polymer according to this method may be used as part of a gel structure, such as a composite with silica gel. The gel may contain additional inorganic, or organic acids. The organic acids may be, for example, $HClO_4$, $H_2SO_4$, $H_3PO_4$, dodecatungstophosphoric acid ($H_3PW_{12}O_{40} \times 40H_2O$), carboxylic acids, and the like.

Figure 2:
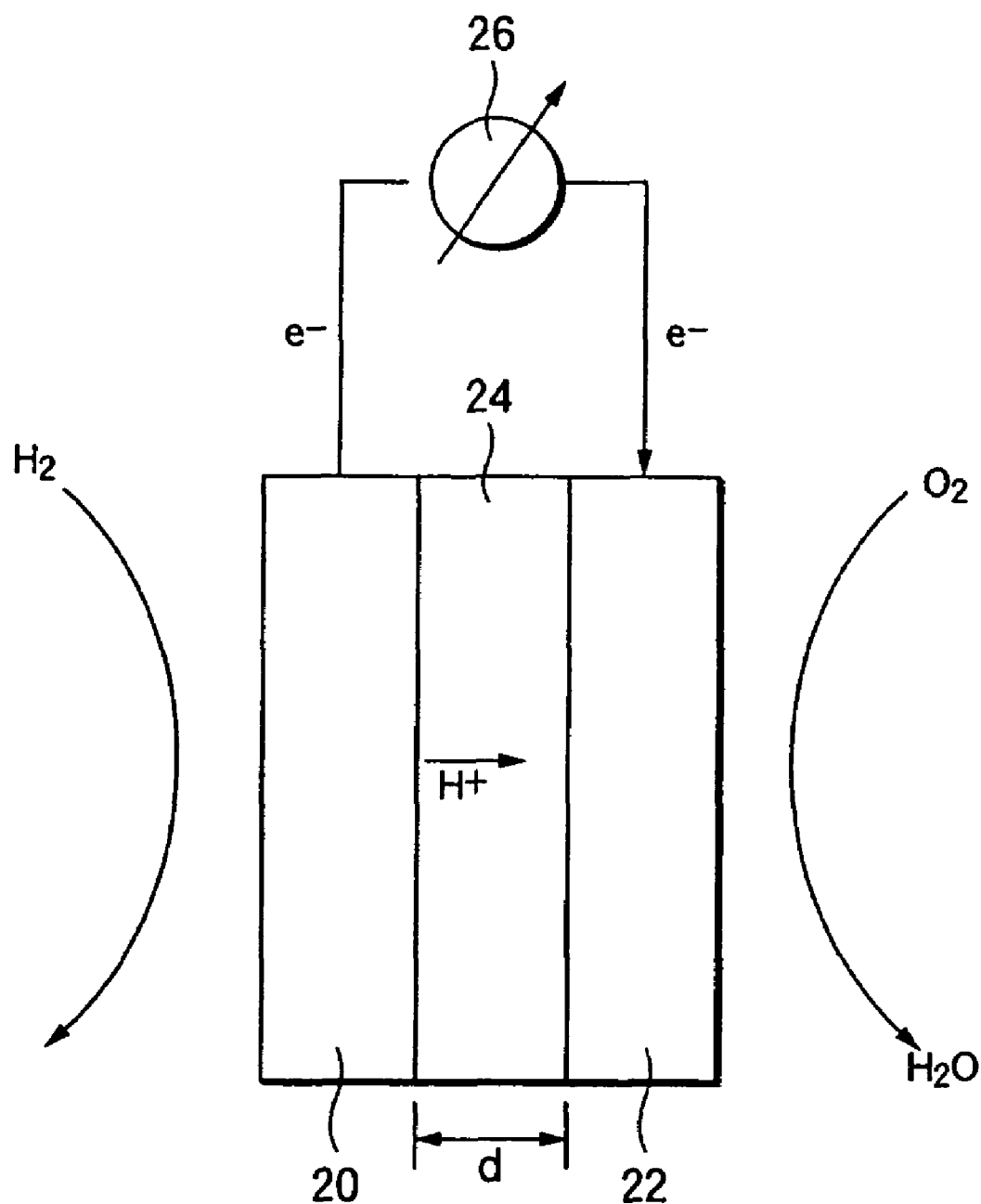
FIG. 2 is a schematic representation of a fuel cell according to an embodiment of the present invention.
Figure 3:
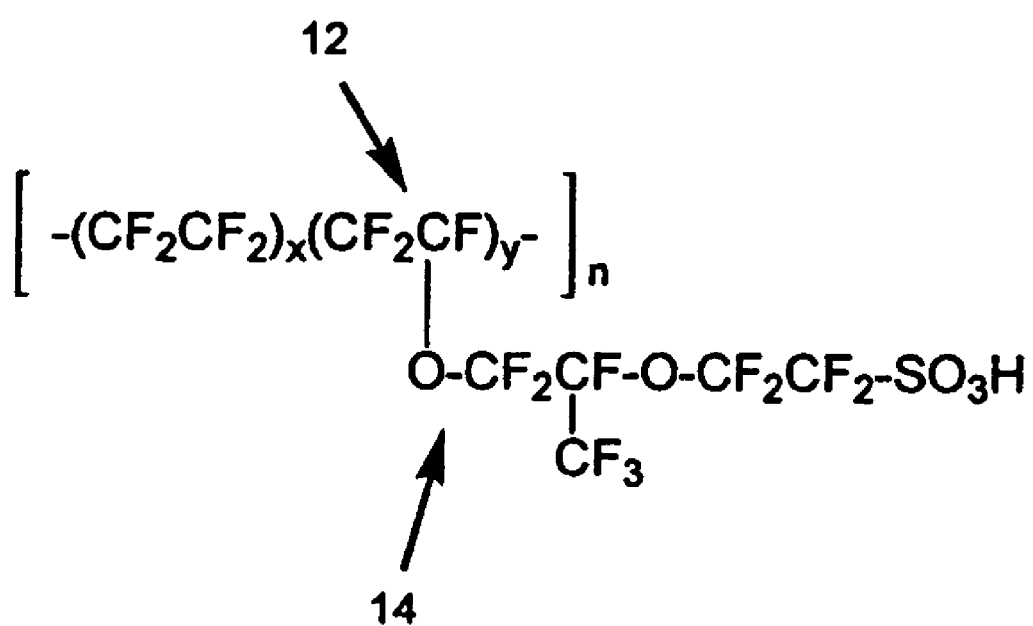
FIG. 3 is a schematic diagram showing the structure of a proton conductive material known in the art.

The polymer framework of proton conductors according to the present invention may then be used as a proton exchange membrane in an electrochemical device such as, for example, a fuel cell. A fuel cell is schematically shown in FIG. 2.

The fuel cell includes a first electrode 20, a second electrode 22, and a proton conductive membrane 24 disposed between the electrodes 20, 22. Conductors connect the electrodes 20, 22 to a load 26 such as, for example, a light bulb, a walkman, an electrical or electronic appliance or device, an electric circuit, and the like. When hydrogen (such as $H_2$) is supplied to the first electrode 20, the hydrogen is broken down into protons ($H^+$) and electrons (e). The electrons move along the conductors from the first electrode 20, drive the load 26, and then move on to the second electrode 22. Meanwhile, the protons move through the proton conductive membrane 24 to the second electrode 22. The second electrode is supplied with oxygen such as, for example, in air or in another source of oxygen. Thus, when the protons and electrons arrive at the second electrode 22 in the presence of oxygen, they recombine to form water ($H_2O$).

The proton conductive membrane 24 has a thickness of d. It is desirable to make d as thin as possible in order to achieve a fuel cell having a self-humidifying characteristic, as well as to reduce material cost. As d decreases, the proton conductance increases, and the ability to easily absorb water increases. If d is thin enough, the water produced at the second electrode 22 will keep the membrane from drying out. This produces a fuel cell with self-humidifying fuel cell, that is there is no need for an external source of humidity to keep the membrane moist. If the membrane dries out, it looses its ability to conduct protons and to prevent $H_2$ molecules from passing therethrough, i.e., the fuel cell will not operate properly. Thus, the density of the membrane must not be so great as to prevent the absorption of water therein. Again, as the thickness d is decreased, there is an increase in the membrane's ability to conduct protons. But this increased ability to conduct protons must be balanced by the necessity of the membrane to block passage of Hz. If the membrane allows the $H_2$ to pass therethrough, then fewer electrons are produced and the efficiency of the fuel cell drops. Thus, the membrane's ability to pass protons and absorb water, while effectively blocking the passage of $H_2$, will determine its requisite thickness.

In a fuel cell having the polymer produced by the above-described exemplary process (i.e., proton conductors having the general formula $C_{60}$—($CF_2$—$CF_2$—O—$CF_2$—$CF_2$—$SO_3H$)$_n$ which are cross-linked by molecules of ($C_8F_{16}$), a membrane thickness of about 20 μm to about 30 μm having acceptable proton conductivity on the order of $10^{-3}$ S/cm—produces a self-humidifying fuel cell that has an excellent conductance.

By way of example and not limitation, the proton conductivity of perfluorohexyl cross-linked materials according to an embodiment of the invention was measured as described in Measurements I to III below.

Measurements I and II:

Water uptake of the materials as depicted in FIG. 5 (n=6) (hereinafter Material FIG. 5 (n=6) and the material depicted in FIG. 6 (n=6) (hereinafter Material FIG. 6 (n=6)) were measured at different temperatures (19° C. and 50° C.). Before the measurements, the following pretreatments were effected.

Pretreatment for measurement I: Dried overnight at a room temperature (19° C.) in a dry air stream (15% humidity).

Pretreatment for Measurement II: Dried overnight at 50° C. in a dry air stream (1.3% humidity).

Figure 8:
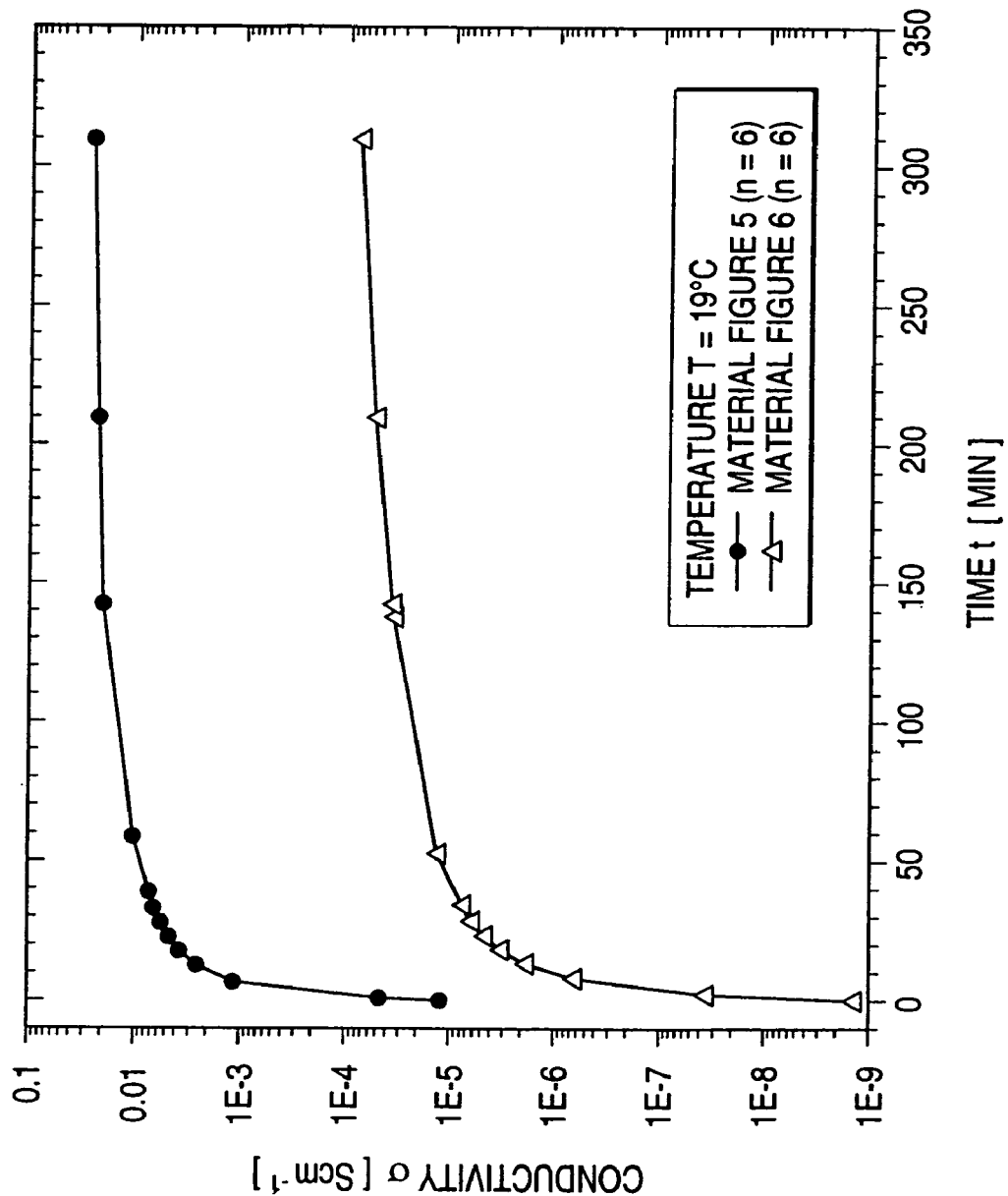
FIG. 8 shows the change in proton conductivity of perfluorohexyl cross-linked materials under a water saturated air stream at 19° C. according to an embodiment of the present invention.
Figure 9:
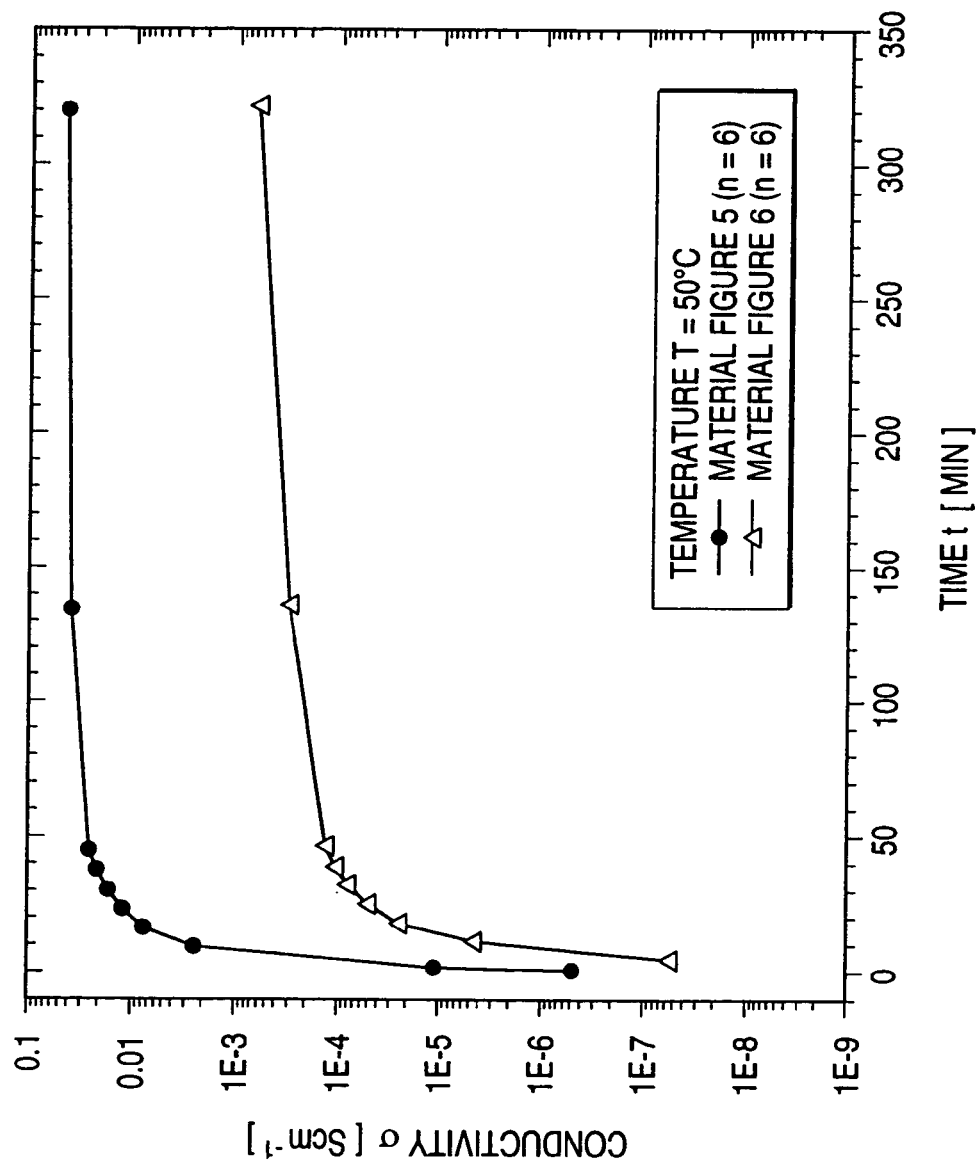
FIG. 9 shows the change in proton conductivity of perfluorohexyl cross-linked materials under a water saturated air stream at 50° C. according to an embodiment of the present invention.

At t=0 in FIGS. 8 and 9, the dry air stream was replaced by a water saturated air stream, and the conductivity versus the time after switching from the dry air stream to the water saturated air stream was recorded. Measurements were taken for a temperature of T=19° C. (measurement I) as shown in FIG. 8, and for T=50° C. (measurement II) as shown in FIG. 9.

As indicated by the results of FIGS. 8 and 9, the materials exhibited fast water uptake.

Figure 10:
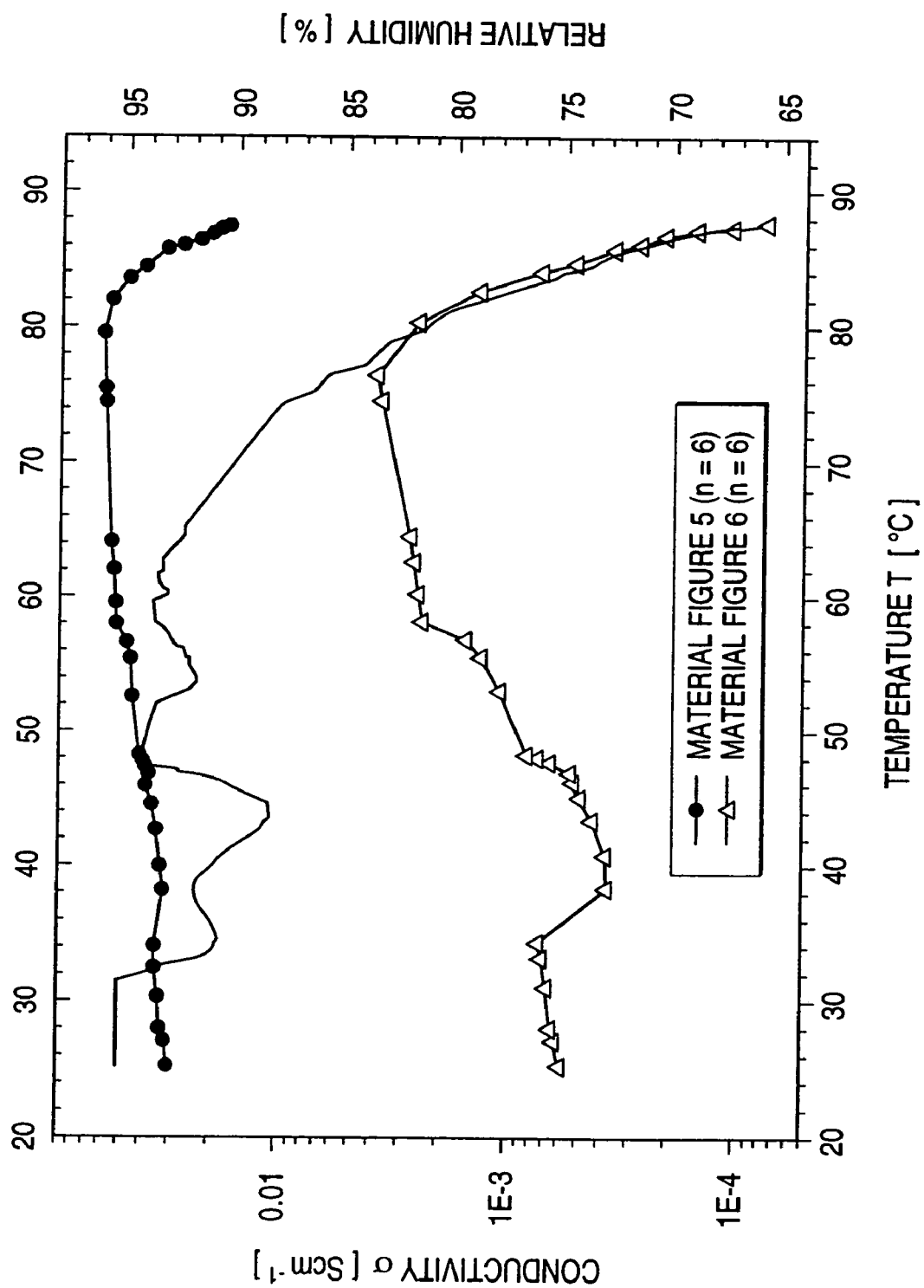
FIG. 10 shows the change in proton conductivity of perfluorohexyl cross-linked materials at various temperatures according to an embodiment of the present invention.

Measurement III:

The proton conductivity at various temperatures was measured. Also, the relative air humidity (R.H.) was registered in order to see the influence of the R.H. on the proton conductivity. As shown in FIG. 10, the material as depicted in FIG. 5 (n=6) (i.e., Material FIG. 5 (n=6)) was shown to be less prone to humidity changes than the material depicted in FIG. 6 (n=6) (i.e., Material FIG. 6 (n=6)).

Measurements I to III, as described above, in general show that the material prepared by a two-step process (Material FIG. 5 (n=6)) exhibits proton conductivity at about two orders of magnitude higher than the material prepared by the one-step process (Material FIG. 6 (n=6)). The same conditions were present when the two samples were measured.

Figure 11:
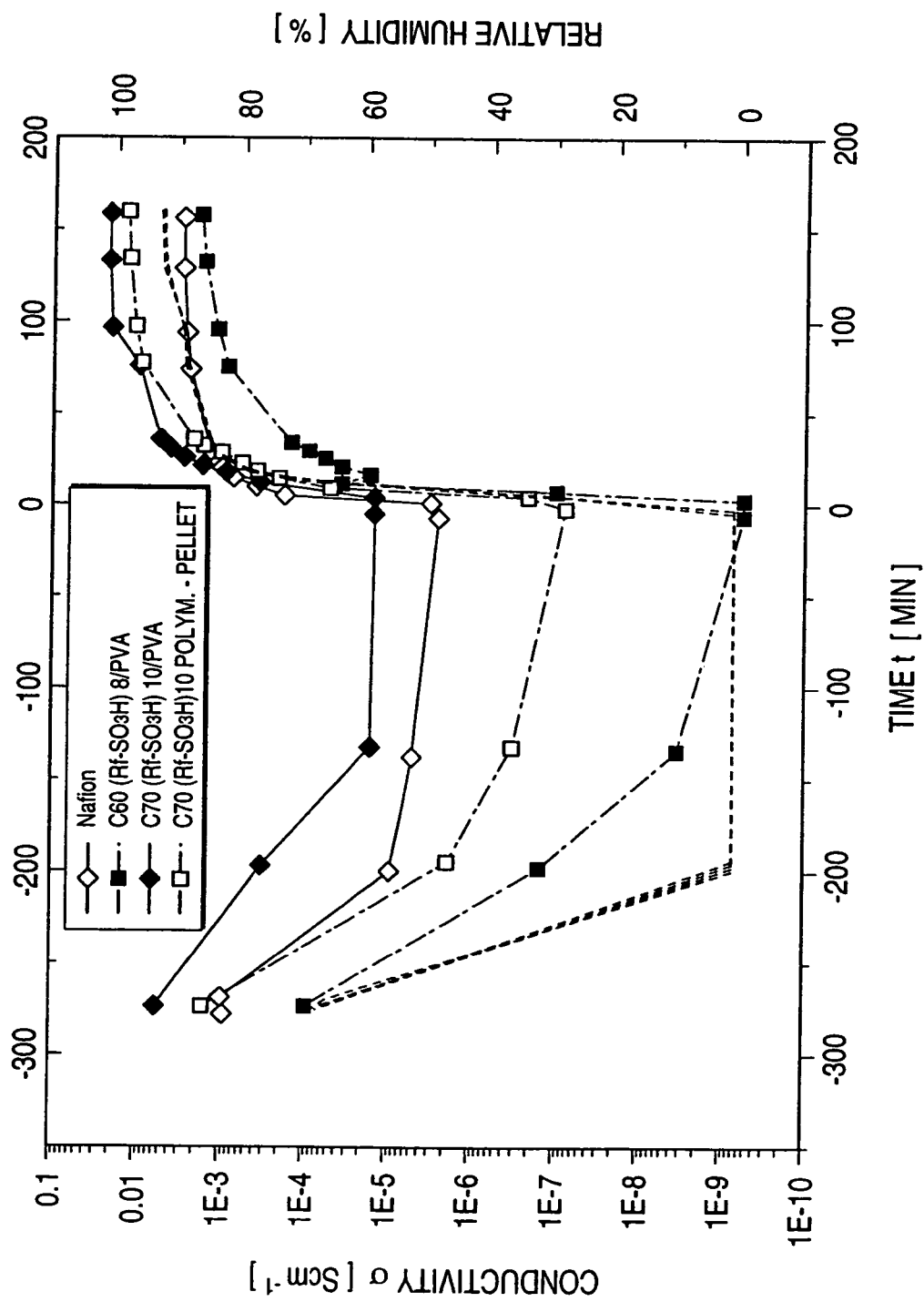
FIG. 11 is a comparison of the change in proton conductivity of perfluorohexyl cross-linked materials based on $C_{70}$, $C_{60}$, and Nafion according to an embodiment of the present invention.

Perflourinated cross-linked materials based on $C_{70}$ were also prepared and tested using reaction conditions similar to those described above for the method of preparing cross-linked materials using $C_{60}$. More specifically, one equivalent of $C_{70}$ was combined with 24 equivalents of I—$CF_2$—$CF_2$—O—$CF_2$—$CF_2$—$SO_2F$ as the spacer-molecule precursor and a 1:1 $C_6F_6$/$CS_2$ solvent mixture. The solution temperature was then raised to about 240° C. for about 94 hours, whereupon greater than 70% of the reactants were reacted (essentially the same yield as when using $C_{60}$). The higher reaction temperature used for $C_{70}$ (240° C.) versus the temperature for $C_{60}$ (200° C.) can be attributed to the lower reactivity of $C_{70}$ as compared to $C_{60}$. The remaining steps of making the perflourinated cross-linked materials based on $C_{70}$ are the same as those described using $C_{60}$. FIG. 11 shows the proton conductivity at various temperatures for samples of the materials based on $C_{70}$, as well as a comparison of the these $C_{70}$ based samples with a respective $C_{60}$ based sample and a Nafion sample. The relative air humidity (R.H.) was also measured in order to see the influence of the R.H. on the proton conductivity.

In this example, from t=−280 min. until t=0, the measurement chamber was purged with dry air. As shown in FIG. 11, during this time, the conductivity of the $C_{70}$ based samples decreased less than the $C_{60}$ based sample, and one $C_{70}$ based sample ($C_{70}$(Rf—$SO_3H$)10/PVA) showed improved behavior when compared to the Nafion sample. At t=0, the dry air stream was replaced by a water saturated air stream which resulted in increasing the conductivity of the samples. FIG. 11 indicates that the $C_{70}$ based samples were less prone to humidity changes than the $C_{60}$ based sample and the Nafion based sample (at least in a case using a PVA membrane).

To further decrease the humidity sensitivity of the proton conductors of the present invention, short linkers may be used as the spacer module to connect the acidic group (the proton conductive function group) with the fullerene core. For example, the linker used in $CF_2CF_2OCF_2CF_2SO_3H$ has a length of about 8 Å, while the linker used in $CF_2SO_3H$ has a length of about 3 Å. Synthesis of materials using short linkers (in combination with $C_{60}$ or $C_{70}$, for example) and methods to turn them insoluble (e.g., cross-linking using perfluoro alkanes and the sulfonimide linkage and the use of binders (for example, PVA)) are as described herein. Using the short linkers allows for a higher volume density of acidic groups in materials (more acidic groups per $cm^3$) which should keep water better since the acidic groups form the hydrophilic part of the materials. This higher interaction with water means that the materials are less prone to humidity changes. Also, the molecules using the short linkers are made much lighter. For example, when using longer linkers with a fullerene core of $C_{60}$, one acidic group has an EW-value of 390 mass units while a second acidic group using short linkers with a fullerene core of $C_{60}$ has an EW-value of 220 mass units. This results in higher conductivity of materials using the shorter linkers. Shorter linkers may lower the EW-value below 220 mass units. Also, the denser packing allowable as a result of these short linkers makes it possible to reduce leaking of fuel when the proton conductors of the present invention with short linkers are employed in a fuel cell device.

The present invention provides a proton conductive compound that has a high conductivity, and that is thermally as well as chemically stable under conditions found in a fuel cell.

The present invention provides a novel fullerene-based proton conductive material combining the advantages of the most widely used proton conductor Nafion, with the benefits of employing a spherical-type fullerene backbone.

Additionally, the present invention achieves a high proton conductivity because these fullerene-based proton conductors have a high number of proton conductive groups per unit of atomic weight. Further, the fullerene-based proton conductors of the present invention have at least a partially fluorinated spacer molecule connecting a proton conductive functional group to the fullerene back bone, whereby the present invention achieves a higher thermal and chemical stability than that of the fullerene-based proton conductors previously known within Applicants' company.

Also, the present invention achieves cross-linked materials having relatively low humidity sensitivity by using short linkers to connect the acidic groups with the fullerene core.

Further, the present invention provides methods of manufacturing the above-described proton conductor, as well as a polymer film thereof. The methods provide reactions in which strict proportions are unnecessary. Therefore, these methods easily can be scaled-up to make large quantities of proton conductors and of proton-conductive polymers.

The present invention provides—due to use of the above-described proton conductive polymer as a proton exchange membrane—an electrochemical device having an acceptable conductance, and self-humidifying characteristics, as well as an increased thermal and chemical stability.

It is contemplated that numerous modifications may be made to the proton conductor, polymer, methods of making the proton conductor and polymer, and the electrochemical device including the proton conductor, of the present invention without departing from the spirit and scope of the invention as defined in the claims.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. An electrochemical device comprising:
a first electrode,
a second electrode; and
a polymer disposed between the first electrode and the second electrode allowing one or more protons to be conducted between the first and second electrodes, said polymer comprises a plurality of proton conductors, each comprising a fullerene molecule, a spacer molecule attached to said fullerene molecule wherein said spacer molecule comprising an at least partially fluorinated molecule, a proton conductive functional group attached to said spacer molecule, and at least one linking molecule connected between at least two of said proton conductors.

2. The electrochemical device of claim 1, wherein said linking molecule comprises an at least partially fluorinated hydrocarbon molecule.

3. The electrochemical device of claim 2, wherein said linking molecule is selected from the group consisting of a partially fluorinated compound, a perfluorinated compound and combinations thereof.

4. The electrochemical device of claim 3, wherein said perfluorinated compound has the general formula $C_nF_{2n}$, wherein n is a natural number.

5. The electrochemical device of claim 3, wherein said perfluorinated compound includes $CF_2$.

6. The electrochemical device of claim 1, wherein said linking molecule is longer than said spacer molecule.

7. The electrochemical device of claim 1, wherein said linking molecule includes an additional functional group.

8. The electrochemical device of claim 7, wherein said additional functional group is selected from the group consisting of an ether, an ester, an amide, a ketone, an acidic group and combinations thereof.

9. The electrochemical device of claim 1, wherein said linking molecule comprises an aryl group.

10. The electrochemical device of claim 1, wherein said linking molecule comprises an at least partially fluorinated molecule.

11. The electrochemical device of claim 1, wherein said linking molecule is connected to the fullerene molecule of at least two of said proton conductors.

12. The electrochemical device of claim 1, wherein said linking molecule is connected to the spacer molecules of at least two of said proton conductors.

13. The electrochemical device of claim 12, wherein at least one fullerene molecule of at least two of said proton conductors has attached thereto an additional functional group selected from the group consisting of an alkyl group, an aryl group, a non-fluorinated molecule, a partially fluorinated molecule, a perfluorinated molecule, an ether group, an ester group, an amide group, a keto group and combinations thereof.

14. The electrochemical device of claim 13, wherein said linking molecule is selected from the group consisting of a partially fluorinated, a perfluorinated, sulfonylimide molecule and combinations thereof.

15. The electrochemical device of claim 14, wherein said linking molecule includes an additional functional group selected from the group consisting of ethers, esters, amides, keto groups and combinations thereof.

16. The electrochemical device according to claim 1, wherein said polymer comprises a film having a thickness ranging from about 20 $\mu$m to about 30 $\mu$m.

17. The electrochemical device according to claim 1, wherein said electrochemical device comprises a hydrogen fuel cell.

18. The electrochemical device according to claim 17, wherein said polymer comprises a film having a thickness allowing said fuel cell to be self-humidifying.

19. The electrochemical device according to claim 1, wherein said electrochemical device comprises an electrolysis cell.

20. The electrochemical device according to claim 1, wherein said electrochemical device comprises a capacitor.

* * * * *

UNITED STATES PATENT AND TRADEMARK OFFICE
CERTIFICATE OF CORRECTION

| | |
|---|---|
| PATENT NO. | : 7,008,713 B2 |
| APPLICATION NO. | : 10/985492 |
| DATED | : March 7, 2006 |
| INVENTOR(S) | : Nuber et al. |

It is certified that error appears in the above-identified patent and that said Letters Patent is hereby corrected as shown below:

Column 14,
Line 66, change "a walkman" to -- WALKMAN (Registered Trademark of Sony Corporation) --.

Signed and Sealed this

Fourth Day of July, 2006

JON W. DUDAS
*Director of the United States Patent and Trademark Office*